(12) United States Patent
Chiou et al.

(10) Patent No.: US 8,704,984 B2
(45) Date of Patent: Apr. 22, 2014

(54) METHOD OF PREPARING COMPOSITE OPTICAL RETARDER

(75) Inventors: Da-Ren Chiou, Zhongli (TW); Tzu-Ying Chen, Zhongli (TW); Wei-Che Hung, Zhongli (TW); De-Ling Hsu, Zhongli (TW); Chiu-Fang Chen, Zhonglie (TW)

(73) Assignee: Far Eastern New Century Corporation, Taipei (TW)

( * ) Notice: Subject to any disclaimer, the term of this patent is extended or adjusted under 35 U.S.C. 154(b) by 101 days.

(21) Appl. No.: 13/368,559

(22) Filed: Feb. 8, 2012

(65) Prior Publication Data

US 2013/0107190 A1 May 2, 2013

(30) Foreign Application Priority Data

Oct. 27, 2011 (TW) .............................. 100139175 A

(51) Int. Cl.
*G02F 1/1337* (2006.01)

(52) U.S. Cl.
USPC .......................................................... 349/124

(58) Field of Classification Search
USPC .................. 349/119, 123–124, 127
See application file for complete search history.

(56) References Cited

U.S. PATENT DOCUMENTS

| | | | |
|---|---|---|---|
| 5,389,698 A | 2/1995 | Chigrinov et al. | |
| 6,649,231 B2 | 11/2003 | Ito | |
| 6,717,644 B2 | 4/2004 | Schadt et al. | |
| 7,901,605 B2 * | 3/2011 | Nam et al. | 264/134 |
| 2004/0263730 A1 * | 12/2004 | Ishizaki | 349/117 |
| 2005/0024562 A1 * | 2/2005 | Hoff et al. | 349/117 |
| 2005/0128380 A1 * | 6/2005 | Zieba et al. | 349/96 |
| 2011/0317084 A1 * | 12/2011 | Lee et al. | 349/15 |
| 2012/0281157 A1 * | 11/2012 | Kim et al. | 349/15 |

OTHER PUBLICATIONS

M. Schadt et al. "Surface-Induced Parallel Alignment of Liquid Crystals by Linearly Polymerized Photopolymers." JJAP, 1992, pp. 2155-2164.

* cited by examiner

*Primary Examiner* — Lauren Nguyen
*Assistant Examiner* — Anthony G Quash
(74) *Attorney, Agent, or Firm* — McClure, Qualey & Rodack, LLP

(57) ABSTRACT

A method of preparing a composite optical retarder is provided. A first and a second liquid crystal coating materials are respectively disposed on opposite surfaces of a photoalignment film to respectively form a first and a second optical retarders. The composite optical retarder having the photoalignment film sandwiched by the first and the second optical retarders is thus obtained.

18 Claims, 3 Drawing Sheets

METHOD OF PREPARING COMPOSITE OPTICAL RETARDER

CROSS-REFERENCE TO RELATED APPLICATION

This application claims the priority benefit of Taiwan application serial no. 100139175, filed Oct. 27, 2011, the full disclosure of which is incorporated herein by reference.

BACKGROUND

1. Technical Field

The disclosure relates to a method of preparing a composite optical retarder. More particularly, the disclosure relates to using a photoalignment method to prepare a composite optical retarder.

2. Description of Related Art

It is known that liquid crystal molecules have different refractive indexes at different axes to have birefringence. Hence, an optical retardation phenomenon is occurred when light passes through the liquid crystal molecules to produce phase difference. This is the optical anisotropy of liquid crystal molecules. Since the optical anisotropy will change the polarization direction of light, liquid crystal molecules can be used to control the light's transmittance to produce bright and dark effects on displays, and thus on display panels. In another aspect, since the optical retardation effect is resulted from the optical anisotropy, a liquid crystal film can be used as an optical retarder. The optical retarder with desired phase difference can be applied to a liquid crystal display to reduce light leakage and increase display contrast to achieve wide view angle effect.

No matter applied to display panels or optical retarders, liquid crystal molecules have to be aligned before they are effectively used. The earliest method to align liquid crystal molecules is forming microgroove structures having a certain direction (i.e. the alignment direction) on an alignment film to align the liquid crystal molecules to achieve alignment effect.

The conventional preparation method for such alignment films is contacting rubbing method to produce microgroove structures on the alignment films. However, the rubbing method cannot be suitably used in preparing alignment films with large area, and thus display panels with large area, since the yield is not sufficiently high and defects can easily occur. Moreover, problems of fine particles, fiber contaminations, or electrostatic effect can easily occur during the rubbing process (please see U.S. Pat. No. 6,649,231) to further influence the alignment effect of the liquid crystal molecules. In another aspect, the rubbing method cannot easily produce multi-domain alignment on an alignment film, since multiple rubbing processes are needed. Accompanying with problems of poor yield, as well as defects and particles contaminations on the surface of the alignment film, the rubbing method cannot satisfy the requirements of wide view-angle display panels via multi-domain alignment.

In order to overcome the drawbacks of the rubbing method, non-contacting alignment methods are provided. In U.S. Pat. No. 5,389,698, a photoalignment method was disclosed. A photocurable resin was irradiated by linearly polarized ultraviolet to align the resin along a preset direction. After crosslinking the resin, the resin with a fixed alignment direction can form a photoalignment film. The mechanism of aligning liquid crystal molecules by the photoalignment film is to distribute the van der Waals force of the resin molecules on the surface of the photoalignment film along the preset directions by the action of the linearly polarized ultraviolet, and then drive the liquid crystal molecules to comply with the preset direction (i.e. the alignment direction), to achieve the alignment effect (M. Schadt, JJAP, 1992). The forgoing van der Waals force distributed along the preset direction is due to the specific distribution of the functional groups or side chains of the resin molecules on the surface of the photoalignment film. Therefore, the distribution of the electron cloud or dipole moment also follows the specific distribution.

The advantage of the photoalignment method is that there is no need to rub or touch the surface of the alignment film to induce the liquid crystal molecules to align with a certain direction. Therefore, the conventional problems about particles and electrostatic effect occurred in the rubbing method can be solved. In another aspect, the photoalignment method can be applied to flexible, arc-shaped, or any other random structured substrate. The limitation of planar hard substrate required by the rubbing method can be overcome. Hence, the photoalignment method can be applied on roll-to-roll continuous process to mass produce the alignment films. In addition, the photoalignment method can also be applied to form another alignment film, with a different alignment direction, on an aligned liquid crystal film without damaging the underlying aligned liquid crystal film's surface. Thus, a composite optical retarder having multiple alignment films and liquid crystal films with different alignment directions can be prepared. Moreover, the alignment directions can be arbitrarily set by the photoalignment method. This is hard to be done by conventional rubbing method.

For meeting various requirements of various types of liquid crystal displays (LCDs), the prior arts used the photoalignment method to stack alignment films with different alignment directions and a liquid crystal layer to decrease light leakage. For example, a vertical alignment LCD needs a positive A plate and a negative C plate to compose a composite optical retarder to compensate the needed phase difference, then the liquid crystal display can reach a better contrast and wide view angle. Or, the cholesterol liquid crystal used in a bright enhancement film of a LCD needs a positive A plate and a positive C plate to compose a composite optical retarder to increase the contrast and improve the hue error problem.

Such applications all need two alignment films to prepare two optical retarders with different alignment directions. In U.S. Pat. No. 6,717,644, a composite optical retarder having two different functional layers (different alignment directions or different phase difference) is disclosed. Two alignment films are used to respectively align two liquid crystal molecular layers. However, the conventional material for the alignment films is quite expensive. Therefore, using two alignment films will increase the production cost and the thickness of the composite optical retarder. It can't meet the requirement of the thinned display panels.

Therefore, a preparation method for a composite optical retarder with a lower production cost is needed.

SUMMARY

In one aspect, the present invention is directed to a method of preparing a composite optical retarder. The method comprises the following step.

(a) A first support substrate is provided. (b) A photoalignment resin is coated on a top surface of the first support substrate, and then irradiated by first linearly polarized ultraviolet to perform photoalignment reaction to form a photoalignment film. (c) A first liquid crystal coating material is coated on a first surface of the photoalignment film, and then irradiated by first non-polarized ultraviolet to cure the first liquid crystal coating material to form a first optical retarder.

(d) A first surface of the first optical retarder is adhered to a second support substrate, and the first support substrate is then removed from the photoalignment film to expose a second surface of the photoalignment film. (e) A second liquid crystal coating material is coated on a second surface of the photoalignment film, and then irradiated by second non-polarized ultraviolet to cure the second liquid crystal coating material to form a second optical retarder.

According to the method provided by this invention, only one photoalignment film is needed to prepare two optical retarders. Therefore, the usage amount of the photoalignment film can be effectively decreased to reduce the cost and a thinned composite optical retarder can be obtained.

Furthermore, since photoalignment is used in the preparation method provided by this invention, the problems of particles and electrostatic effect on surfaces of alignment film for preparing composite optical retarders in the prior arts can also be solved.

In another aspect, a composite optical retarder made by the method above is provided. Since one less alignment film is needed, comparing with the prior arts, the thickness of the composite optical retarder provided by this invention can be decreased to obtain a thinned composite optical retarder.

Many of the attendant features will be more readily appreciated as the same becomes better understood by reference to the following detailed description considered in connection with the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In light of foregoing, this invention provides a method of preparing a composite optical retarder to solve the high cost problem of the prior arts.

In order to illustrate certain aspects of this invention to persons skilled in the art, FIGS. 1-6 are used to show an exemplary method for preparing a composite optical retarder.

Figure 2:
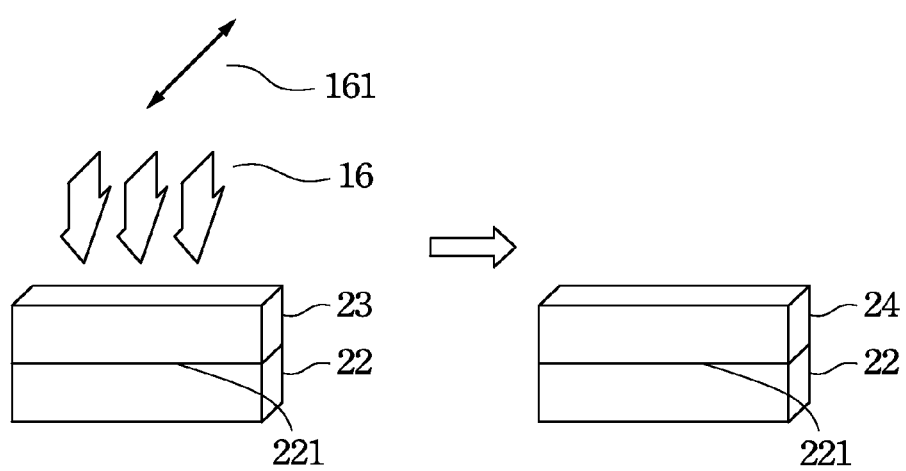
FIG. 2 is a diagram of forming a photoalignment film.

FIG. 2 is a diagram of forming a photoalignment film. In FIG. 2, a first support substrate 22 is provided first. Then, a photoalignment resin 23 is coated on the first support substrate 22, and then irradiated by first linearly polarized ultraviolet 16 to perform photoalignment reaction to form a photoalignment film 24.

It is known that a photoalignment resin will start a photochemical reaction under the irradiation of light. According to various reaction mechanisms, the photoalignment resin can be classified to three types of photoisomerization, photocrosslinking, and photodecomposition. There are no particular limitations to apply which kind of photoalignment resins in this invention. A preferable photoalignment resin is of photo-crosslinking type.

Figure 1:
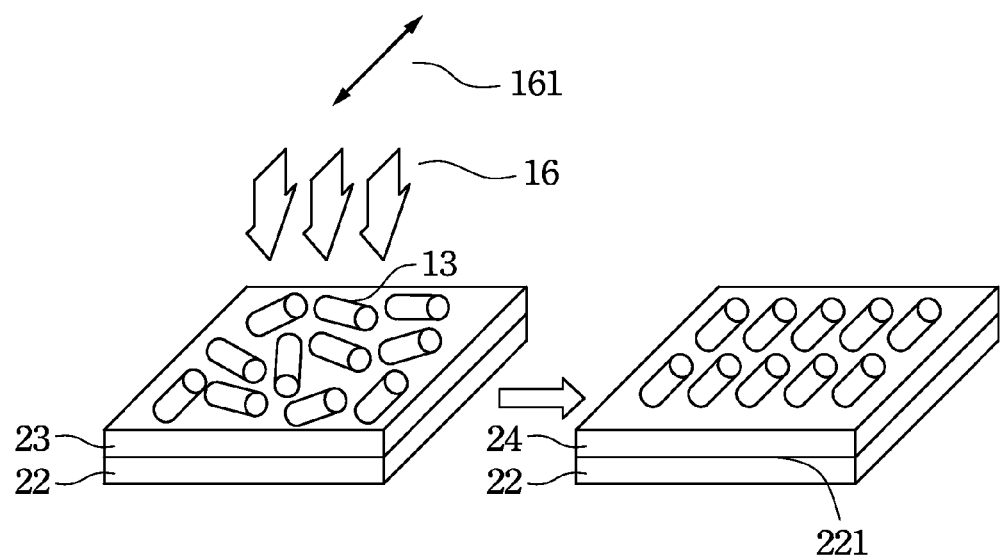
FIG. 1 is a diagram of photoalignment resin molecules proceeding photoalignment reaction.

FIG. 1 is a diagram of photoalignment resin molecules proceeding photoalignment reaction. In FIG. 1, a photoalignment resin 23 of photo-crosslinking type is taken to be illustrated. The photoalignment resin 23 is irradiated by the first linearly polarized ultraviolet 16. Then, the molecules 13 of the photoalignment resin 23 are crosslinked. During the crosslinking process, the molecules 13 are influenced by the first linearly polarized ultraviolet 16 to align with a polarization direction 161 of the first linearly polarized ultraviolet 16, and then crosslinked and cured. This process is called photoalignment reaction.

The photoalignment resin 23 is a resin having at least one photoreactive functional group. The photoreactive functional group applicable in this invention comprises, but not limited to, cinnamate, coumarin, chalcone, maleimide, quinolinone, or bisbenzylidene.

It is known that polarized ultraviolet is a planarpolarized light having a single linear polarization direction. The polarized ultraviolet is produced by sieving out other directions of non-polarized ultraviolet to leave only one linear direction of the non-polarized ultraviolet. Generally, a polarized film or an optical grating can be used to obtain polarized ultraviolet. The non-polarized ultraviolet is produced by a common light source, and also called spherical light, which has equal intensity in all directions to illuminate.

The optimal irradiation dosage of the forgoing first linearly polarized ultraviolet 16 can be determined by one skilled in the art on demand, such as kinds of apparatus and photoalignment resin, etc. It has been known that the photoalignment reaction can be performed by irradiating the photoalignment resin by linearly polarized ultraviolet having a dosage at least 5 mJ/cm$^2$. Therefore, the minimum dosage of the linearly polarized ultraviolet's irradiation is preferably to be 5 mJ/cm$^2$.

The method of coating the photoalignment resin 23 on the top surface 221 of the first support substrate 22 has no particular limitations. The coating method can be determined by a practitioner to choose one convenient method. Therefore, the coating method comprises, but is not limited to, spin coating, bar coating, dip coating, slot coating, or roll to roll etc.

The coating thickness of the photoalignment resin 23 has no particular limitations, and has no influence on the alignment of the liquid crystal molecules. For the sake of operational convenience and cost, the coating thickness is better to be 10 nm-1 µm, and even better to be 10-50 nm.

In addition, the coated photoalignment resin 23 can be further dried to remove the solvent used in the photoalignment resin 23 to facilitate the coating of the photoalignment resin 23 on the top surface 221 of the first support substrate 22. Thus, the surface of the coated photoalignment resin 23 can be kept dry to assist the subsequent processing or preservation. For example, the coated photoalignment resin 23 can be dried by heat plate, oven, or vacuum drier, etc. Any other possible ways known by persons skilled in the art can be chosen for the practice's convenience, and has no particular limitations thereto.

Figure 3:
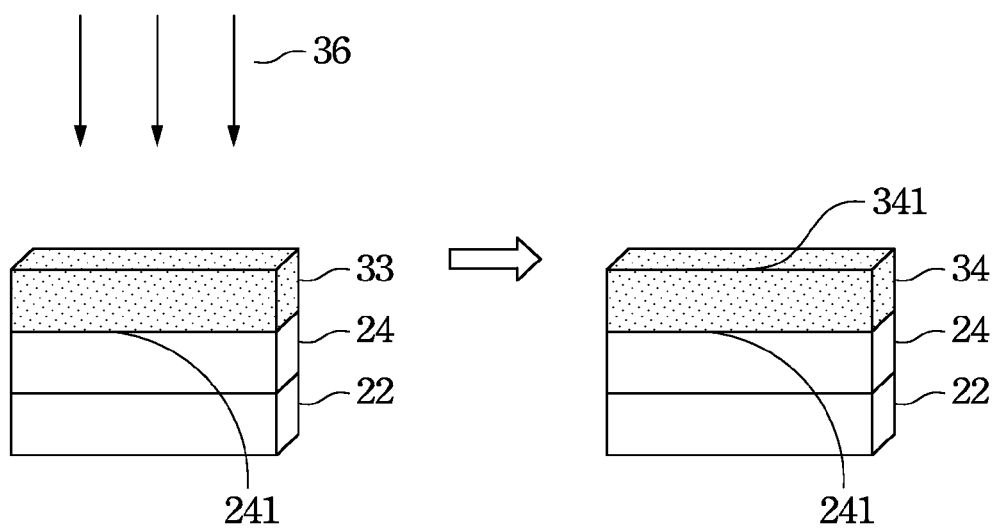
FIG. 3 is a diagram of forming a first optical retarder.

FIG. 3 is a diagram of forming a first optical retarder. In FIG. 3, a first liquid crystal coating material 33 can be coated on a first surface 241 of the photoalignment film 24, and then irradiated by first non-polarized ultraviolet 36 to cure the first liquid crystal coating material 33 to form a first optical retarder 34.

According to an embodiment of this invention, the first liquid crystal coating material 33 is influenced by the van der Waals force interaction from the molecules located on the surface of the photoalignment film 24 when coated on the first surface 241 of the photoalignment film 24. Hence, the molecules of the first liquid crystal coating material 33 will align with a preset direction (i.e. the aligned direction) to obtain an alignment effect.

Furthermore, various axes of the liquid crystal molecules have various refractive indexes, also called as birefringence. The polarization direction of the light is altered when light passes through the liquid crystal molecules to occur optical retardation phenomenon and thus produce phase difference. It has been known that since an aligned liquid crystal molecular layer has been aligned along a certain direction, the aligned liquid crystal molecular layer has uniform birefringence to be used as an optical retarder. The phase difference of the optical retarder can be calculated by the following equation (a):

$$Ro = \Delta n \cdot d \quad (a)$$

In the equation (a), Ro is the retardation value, $\Delta n$ is the difference between the diffraction indexes of various molecular axes, and d is the thickness of the liquid crystal molecular layer. $\Delta n$ is an inherent physical property of the liquid crystal material. Different liquid crystal materials have different $\Delta n$ value. The thickness of the liquid crystal molecular layer can be controlled by the coating method and the relative parameters to achieve retardation values.

The coating method of the first liquid crystal material 33 has no particular limitations. A convenient coating method can be chosen by a practitioner. Therefore, the coating method comprises, but is not limited to, spin coating, bar coating, dip coating, slot coating, or roll to roll etc. Moreover, the coating thickness of the first liquid crystal material 33 can be adjusted by spin speed, specification of the used bar, or roller speed.

The applicable material of the first liquid crystal material 33 comprises, but not limited to, a photo-crosslinking liquid crystal material having acrylate groups.

After coating the first liquid crystal material 33 on the first surface 241 of the photoalignment film 24, the first liquid crystal material 33 can be further dried to remove the solvent of the first liquid crystal material 33 to aid the subsequent processing or preserving. For example, the coated first liquid crystal material 33 can be dried by heat plate, oven, or vacuum drier, etc. Any other possible ways known by persons skilled in the art can be chosen for the practice's convenience, and has no particular limitations thereto.

The first liquid crystal coating material 33 has at least one acrylate functional group capable of proceeding photochemical reaction, the first liquid crystal coating material 33 can be crosslinked by the unsaturated double bonds of the acrylate groups to form a cured liquid crystal film.

The optimal irradiation dosage of the first non-polarized ultraviolet 36 can be determined by one skilled in the art on demand, such as types of apparatus and liquid crystal material, etc. Since the first liquid crystal material 33 comprises photo-crosslinking type of liquid crystal material, the energy of the first non-polarized ultraviolet 36 is better to be 20-1000 mJ/cm$^2$, and even better to be 170-500 mJ/cm$^2$.

The irradiation dosage of the first non-polarized ultraviolet 36 is used only to cure the first liquid crystal material 33 aligned with the preset direction. However, a conventional dosage of about 1500-5000 mJ/cm$^2$ is far greater than the applicable dosage of this invention. The conventional dosage can make the non-polarized ultraviolet penetrate the first liquid crystal material 33 to damage the distribution of electron cloud and dipole of the photoalignment film 24. The alignment of the surface molecules of the photoalignment film 24 can be thus lost or destroyed, and the photoalignment film 24 cannot align the molecules of the first liquid crystal material 33. However, although the function of aligning liquid crystal molecules of the photoalignment film 24 is lost, it has no influence on the alignment of the already cured first liquid crystal, i.e. the first optical retarder 34. Therefore, after irradiated by high energy ultraviolet, it is the main reason that the conventional photoalignment film can be used to form only a first optical retarder without hurting the optical properties of the first optical retarder, and cannot be used to form a second optical retarder on the opposite surface of the photoalignment film 24.

Figure 4:
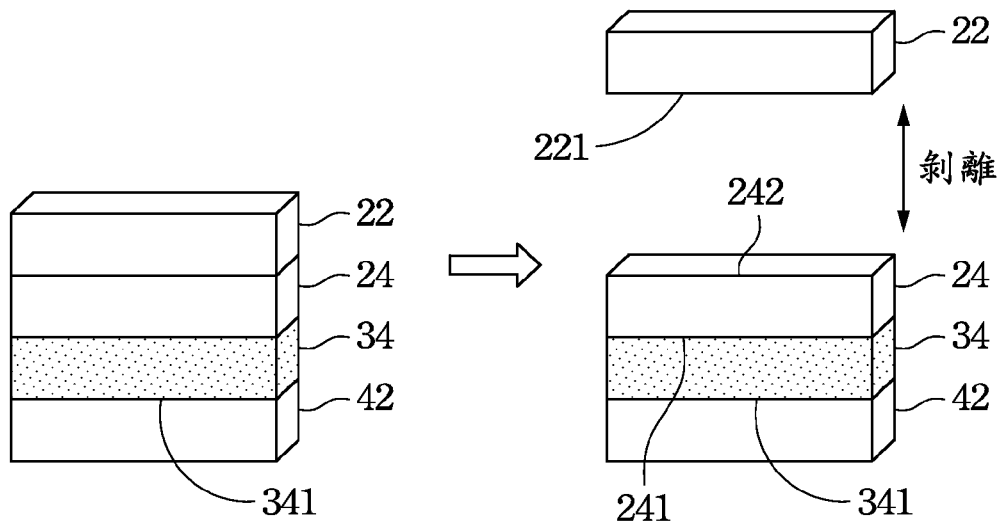
FIG. 4 is a diagram illustrating the adhering of the first optical retarder to a second support substrate and removing the first support substrate from the photoalignment film.

FIG. 4 is a diagram of adhering the first optical retarder to a second support substrate and removing the first support substrate from the photoalignment film. In FIG. 4, a first surface 341 of the first optical retarder 34 is adhered to a second support substrate 42.

The method of adhering the first surface 341 of the first optical retarder 34 to the second support substrate 42 has no particular limitations. For example, a pressure sensitive glue or a UV glue can be applied between the first retarder 34 and the second support substrate 42 to adhere them both. Another way is applying an adhesive surface treatment on the surface of the second support substrate 42. Persons skilled in the art can also choose other adhering methods to adhere the first retarder 34 and the second support substrate 42, and the applicable range of this invention has no particular limitations thereto.

In FIG. 4, the first support substrate 22 is then removed from the photoalignment film 24 to expose a second surface 242 of the photo alignment film 24.

For more easily removing the first support substrate 22, the top surface 221 of the first support substrate 22 can be treated by a surface treatment having release effect. The surface treatment having release effect has no particular limitations. For example, the releasing surface treatment comprises, but not limited to, adhering a release film or coating a release resin layer on the top surface 221 of the first support substrate 22. Any applicable methods known by the persons skilled in the art can be used, and the applicable range of this invention has no particular limitations thereto.

The applicable material of the first support substrate 22 and the second support substrate 42 respectively comprises, but not limited to, glass, triacetyl cellulose, polyester-based resin, acetate-based resin, polyethersulfone-based resin, polycarbonate-based resin, polyamide-based resin, polyimide-based resin, polyolefin-based resin, acrylic-based resin, polyvinyl chloride-based resin, polystyrene-based resin, polyvinyl alcohol-based resin, polyarylate-based resin, polyphenylene sulfide-based resin, polyvinylidene chloride-based resin, or (methyl)acrylic-based resin. The materials of the first support substrate 22 and the second support substrate 42 can be the same or different, and depend on the requirements.

For the considerations of operational convenience, material saving, and production cost, the composite optical retarder above can be directly applied on the needed optical film assembly. Therefore, the types of the second support substrate 42 comprises, but is not limited to, a release film, a polarizer plate, a protect film, a diffuser film or plate, a light guide plate, bright enhancement film, a flexible panel, or a touch panel.

Figure 5:
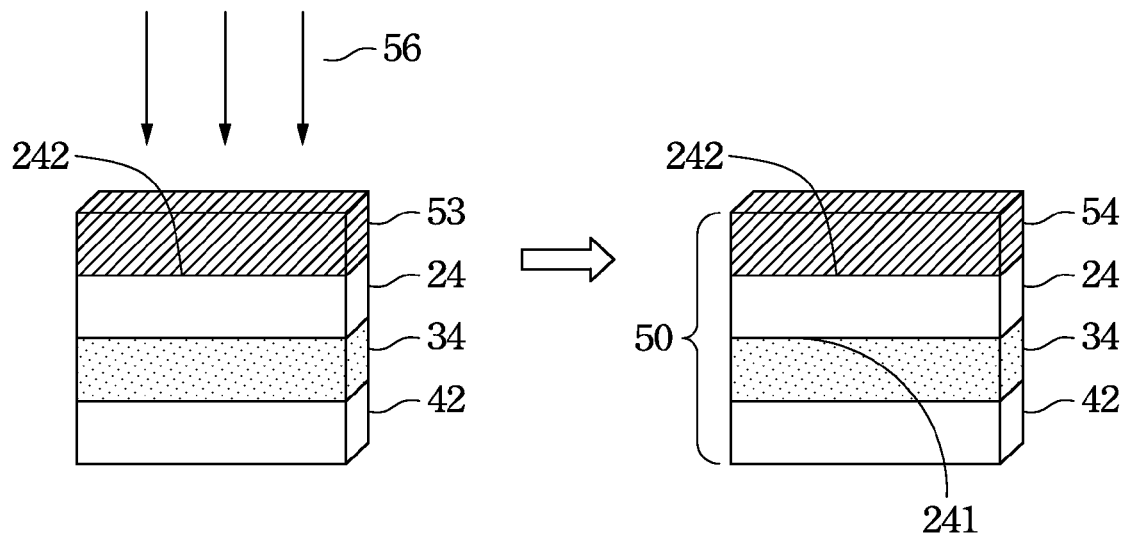
FIG. 5 is a diagram of forming a second optical retarder.

FIG. 5 is a diagram of forming a second optical retarder. In FIG. 5, a second liquid crystal coating material 53 is coated on a second surface 242 of the photoalignment film 24, and then irradiated by a second non-polarized ultraviolet 56 to cure the second liquid crystal coating material 53 to form a second optical retarder 54.

According to an embodiment of this invention, when the second liquid crystal coating material 53 is coated on the second surface 242 of the photo alignment film 24, the molecules of the second liquid crystal coating material 53 will be driven by the surface molecules of the photo alignment film 24 to align with a preset direction.

The second liquid crystal coating material 53 comprises, but not limited to, a photo-crosslinking liquid crystal material having acrylate groups.

The optimal irradiation dosage of the second non-polarized ultraviolet 56 can be determined by practitioners on demand, such as types of apparatus and liquid crystal material, etc. The irradiation dosage has no particular limitations as long as the second liquid crystal material 53 can be cured. In addition, since the second liquid crystal material 53 comprises photo-crosslinking type of liquid crystal material, the energy of the second non-polarized ultraviolet 56 is better to be at least 20 mJ/cm$^2$ to cure the second liquid crystal material 53.

Furthermore, the photoalignment film 24 is not needed any more. Therefore, even if the photoalignment film 24 is irradiated by over dosage of the second non-polarized ultraviolet 56 to lose the alignment function, the alignment of the molecules in the already cured second liquid crystal, i.e. the second optical retarder 54, is still not affected.

The coating method of the second liquid crystal material 53 has no particular limitations. A convenient coating method can be chosen by a practitioner. Therefore, the coating method comprises, but is not limited to, spin coating, bar coating, dip coating, slot coating, or roll to roll etc. Moreover, the coating thickness of the second liquid crystal material 53 can be adjusted by spin speed, specification of the used bar, or roller speed.

After coating the second liquid crystal material 53 on the second surface 242 of the photoalignment film 24, the second liquid crystal material 53 can be further dried to remove the solvent of the second liquid crystal material 53. The surface of the second liquid crystal material 53 can be kept drying to aid the subsequent processing or preserving. For example, the coated second liquid crystal material 53 can be dried by heat plate, oven, or vacuum drier, etc. Any other possible ways known by persons skilled in the art can be chosen for the practice's convenience, and has no particular limitations thereto.

Figure 6:
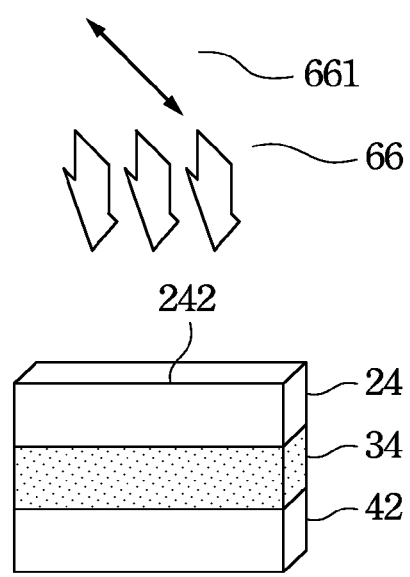
FIG. 6 is a diagram of irradiating the second surface of the photoalignment film by a second linearly polarized ultraviolet in a polarized direction different from the polarized direction of the first linearly polarized ultraviolet.

FIG. 6 is a diagram of preparing a composite optical retarder according to another embodiment of this invention. Before coating the second liquid crystal coating material 53 on the second surface 242 of the photoalignment film 24, the second surface 242 of the photoalignment film 24 can be further irradiated by a second linearly polarized ultraviolet 66 having a polarized direction 661 different from the polarized direction 161 of the first linearly polarized ultraviolet 16 in FIG. 2. Then, the molecules on the second surface 242 of the optical alignment film 24 can be aligned in a different preset direction. Hence, the second liquid crystal coating material 53 can have an alignment direction different from the alignment direction of the first liquid crystal coating material 33 to form a second optical retarder 54. A composite optical retarder 50 comprising the first optical retarder 34 and the second optical retarder 54 aligned in different directions can thus be obtained.

For preparing the composite optical retarder having various alignment directions, the irradiating dosage of the second linearly polarized ultraviolet 66 has no particular limitations. But, the irradiation dosage of the second linearly polarized ultraviolet 66 has to be greater than the first linearly polarized ultraviolet 16 to alter the alignment direction of the photoalignment film. An optimal irradiation dosage of the second linearly polarized ultraviolet 66 can be chosen according to practice convenience. Since a higher irradiation dosage of the second linearly polarized ultraviolet 66 needs a longer irradiating time and a greater energy consumption. Therefore, the irradiating dosage of the second polarized ultraviolet 66 is better no more than 1000 mJ/cm$^2$, and even better no more than 500 mJ/cm$^2$.

In another aspect, if the irradiation dosage of the first linearly polarized ultraviolet 16 is too high, the resin molecules on the second surface 242 of the photoalignment film 24 will align with the preset direction 161 and be completely crosslinked, and thus cannot change their alignment direction under the influence of the second linearly polarized ultraviolet 66. Therefore, for forming a composite optical retarder having a first optical retarder and a second optical retarder with different alignment directions, the irradiation dosage of the first polarized ultraviolet 16 cannot be too much, which may completely cure the resin molecules of the photoalignment film 24. Accordingly, the irradiation dosage of the first linearly polarized ultraviolet 16 is at most to be 300 mJ/cm$^2$.

According to another embodiment of this invention, a composite optical retarder prepared by the method above is also provided. Referring to FIG. 5, the composite optical retarder sequentially comprises, from bottom to top, a second support substrate 42, a first optical retarder 34, a photoalignment film 24, and a second optical retarder 54. The photoalignment film 24 is used to align the first optical retarder 34 and the second optical retarder 54. The first optical retarder 34 and the second optical retarder 54 have the same or different alignment directions.

Accordingly, only one photoalignment film is needed to produce two optical retarders. Therefore, the usage amount of the photoalignment film can be effectively decreased to have a lower production cost. Moreover, a thinned composite optical retarder can be obtained.

Furthermore, since photoalignment method is used in the preparation method provided by this invention, the problems of creating particles and electrostatic effect on surfaces of alignment film for preparing composite optical retarders in the prior arts can be solved.

In another aspect, a composite optical retarder made by the method above is provided. Since one less alignment film is needed, comparing with the prior arts, the thickness of the composite optical retarder provided by this invention can be decreased to obtain a thinned composite optical retarder.

Some embodiments are disclosed to more detail illustrate the method provided by this invention. However, the embodiments are only by examples, not used to limit this invention. The scope of this invention should be determined by the attendant claims.

EMBODIMENTS

Preparation of the Photoalignment Film

A photoalignment resin is coated on a substrate, and then cured by irradiation of a linearly polarized ultraviolet to form a photoalignment film. This preparation comprises the following steps:

1. Methylethylketone and cyclopentanone were mixed in a weight ratio of 1:1 to prepare a mixed solvent of 3.5 g.

2. 0.5 g of a photoalignment resin (Switzerland, Rolic, ROP103, cinnamate, solid content 10 wt %) was added into the 3.5 g mixed solvent of step 1 to be diluted to a solid content of 1.25 wt %.

3. After spin coating on a polyethylene terephthalate (PET) substrate (Japan, Toyobo, A4100, 10 cm×10 cm×100 μm), the prepared photoalignment resin of step 2 was baked in a 100° C. oven for 2 minutes to remove solvent, and then taken out until back to room temperature.

4. The room-temperature photoalignment resin of step 3 was crosslinked by irradiation of the first linearly polarized ultraviolet at a dosage of 20 mJ/cm$^2$ to form a photoalignment film.

Preparation of Liquid Crystal Coating Solution

Liquid crystal coating solution A: 2 g of a photo crosslinking liquid crystal material (German, Merck, 03011, solid content 30 wt %) was added to 1 g cyclopentanone to prepare the liquid crystal coating solution A with a solid content of 20 wt %.

Liquid crystal coating solution B: A photo crosslinking liquid crystal material (Switzerland, Rolic, Rof5101, solid content 30 wt %) can be directly used without dilution.

Liquid crystal coating solution C: 1.35 g of photo crosslinking liquid crystal material (German, BASF, LC242), 0.11 g of a chiral dopant (German, BASF, LC756), and 0.07 g of a photo initiator (USA, Ciba, TPO) are added with toluene to sufficiently dissolve in the toluene. The liquid crystal coating solution C with a solid content of 29.2 wt % was thus prepared.

A. Preparing Various Types of Composite Optical Retarders

EXAMPLE 1

(1.1) After spin coating 3 g liquid crystal coating solution A on first surface of a photoalignment film (3000 rpm, 40 seconds), the solvent of the liquid crystal coating solution A was removed by baking in an oven at 80° C. for 5 minutes. After taken out and returning to room temperature, the liquid crystal coating solution A was irradiated by 20 mJ/cm$^2$ of non-polarized ultraviolet (USA Fusion, Fusion UV chamber) in nitrogen atmosphere and then cured to form a first optical retarder. Polarization analyzer and retardation analyzer (Japan, Oji Scientific Instruments, Kobra) were used to confirm the alignment effect of the first optical retarder.

(1.2) The first surface of the first optical retarder was attached to a triacetyl cellulose (TAC) substrate (Japan, Konica, 10 cm×10 cm×80 μm) by a pressure sensitive glue. The PET substrate was then removed from the photoalignment film to expose the second surface which originally attached to PET of the photoalignment film in the air.

(1.3) After spin coating the liquid crystal coating solution B on the exposed surface (the second surface) of the photoalignment film (1000 rpm, 40 seconds), the solvent of the liquid crystal solution B was then removed in an oven at 55° C. for 5 minutes. After taken out and returning to room temperature, the liquid crystal solution B was irradiated by 470 mJ/cm$^2$ of non-polarized ultraviolet in nitrogen atmosphere and cured to form a second optical retarder. Polarization analyzer and retardation analyzer (Japan, Oji Scientific Instruments, Kobra) were used to confirm the alignment effect of the composite optical retarder.

EXAMPLE 2

(2.1) The implementation method was the same as the step (1.1), but the liquid crystal coating solution A was irradiated by 170 mJ/cm$^2$ of non-polarized ultraviolet and then cured to form a first optical retarder.

(2.2) The implementation method was the same as the step (1.2).

(2.3) The implementation method was the same as the step (1.3).

EXAMPLE 3

(3.1) The implementation method was the same as the step (1.1), but the liquid crystal coating solution A was changed to 5 g liquid crystal coating solution C, which was irradiated by 300 mJ/cm$^2$ of non-polarized ultraviolet and then cured to form a first optical retarder.

(3.2) The implementation method was the same as the step (1.2).

(3.3) The implementation method was the same as the step (1.3).

EXAMPLE 4

(4.1) The implementation method was the same as the step (1.1), but the liquid crystal coating solution A was changed to 3 g liquid crystal coating solution B, which was irradiated by 470 mJ/cm$^2$ of non-polarized ultraviolet and then cured to form a first optical retarder.

(4.2) The implementation method was the same as the step (1.2).

(4.3) The implementation method was the same as the step (1.3), but the liquid crystal coating solution was 5 g liquid crystal coating solution C, which was irradiated by 300 mJ/cm$^2$ of non-polarized ultraviolet and then cured to form a second optical retarder.

EXAMPLE 5

(5.1) The implementation method was the same as the step (4.1), but liquid crystal coating solution B was irradiated by 700 mJ/cm$^2$ of non-polarized ultraviolet and then cured to form a first optical retarder.

(5.2) The implementation method was the same as the step (4.2).

(5.3) The implementation method was the same as the step (4.3).

EXAMPLE 6

(6.1) The implementation method was the same as the step (4.1), but liquid crystal coating solution B was irradiated by 980 mJ/cm$^2$ of non-polarized ultraviolet and then cured to form a first optical retarder.

(6.2) The implementation method was the same as the step (4.2).

(6.3) The implementation method was the same as the step (4.3).

COMPARATIVE EXAMPLE 7

(6.1) The implementation method was the same as the step (4.1), but liquid crystal coating solution B was irradiated by 1100 mJ/cm$^2$ of non-polarized ultraviolet and then cured to form a first optical retarder.

(7.2) The implementation method was the same as the step (4.2).

(7.3) The implementation method was the same as the step (4.3).

The irradiation dosage of the non-polarized ultraviolet and the alignment effect of the examples above were listed in Table 1 below.

TABLE 1

Comparison of alignment effect of composite optical retarders

| | Irradiation dosage for forming the first optical retarder (mJ/cm$^2$) | Alignment effect of the first optical retarder | Alignment effect of the composite optical retarder |
|---|---|---|---|
| Example 1 | 20 | good | good |
| Example 2 | 170 | good | good |
| Example 3 | 300 | good | good |
| Example 4 | 470 | good | good |
| Example 5 | 700 | good | good |
| Example 6 | 980 | good | good |
| Comparative Example 7 | 1100 | good | Cannot be analyzed by polarization analyzer |

From Table 1, it can be known that the alignment direction of the composite optical retarder cannot be identified when the irradiation dosage of the non-polarized ultraviolet is 1100 mJ/cm$^2$. Since the alignment ability of the photoalignment film was damaged by the over irradiation dosage, the alignment of the composite optical retarder with the preset direction was not obvious and thus the alignment direction could not be identified easily. Therefore, the irradiation dosage of the non-polarized ultraviolet is better to be 20-1000 mJ/cm$^2$ for forming the first optical retarder according to the embodiments of this invention.

B. Preparing Composite Optical Retarders with Various Alignment Directions

COMPARATIVE EXAMPLE 8

(8.1) The implemental method was the same as step (1.1), but the liquid crystal coating solution was 3 g liquid crystal coating solution B, which was irradiated by 700 mJ/cm$^2$ of non-polarized ultraviolet and then cured to form a first optical retarder.

(8.2) The implementation method was the same as the step (1.2).

(8.3) The implementation method was the same as the step (1.3).

COMPARATIVE EXAMPLE 9

(9.1) The implemental method was the same as step (8.1).
(9.2) The implemental method was the same as step (8.2). In addition, the exposed surface (i.e. the second surface above) of the photoalignment film was irradiated by 10 mJ/cm$^2$ of a second linearly polarized ultraviolet with a polarized direction orthogonal to the first linearly polarized ultraviolet.
(9.3) The implemental method was the same as step (8.3).

COMPARATIVE EXAMPLE 10

(10.1) The implemental method was the same as step (8.1).
(10.2) The implemental method was the same as step (8.2). In addition, the exposed surface of the photoalignment film was irradiated by 20 mJ/cm$^2$ of a second linearly polarized ultraviolet with a polarized direction orthogonal to the first linearly polarized ultraviolet.
(10.3) The implemental method was the same as step (8.3).

COMPARATIVE EXAMPLE 11

(11.1) The implemental method was the same as step (8.1), but the chosen photoalignment film was irradiated by first linearly polarized ultraviolet with an irradiation dosage of 30 mJ/cm$^2$ to crosslink and align.
(11.2) The implemental method was the same as step (8.2). In addition, the exposed surface of the photoalignment film was irradiated by 30 mJ/cm$^2$ of a second linearly polarized ultraviolet with a polarized direction orthogonal to the first linearly polarized ultraviolet.
(11.3) The implemental method was the same as step (8.3).

COMPARATIVE EXAMPLE 12

(12.1) The implemental method was the same as step (11.1), but the first linearly polarized ultraviolet with an irradiation dosage of 100 mJ/cm$^2$ was used to crosslink and align the photoalignment film.
(12.2) The implemental method was the same as step (11.2). In addition, the exposed surface of the photoalignment film was irradiated by 50 mJ/cm$^2$ of a second linearly polarized ultraviolet with a polarized direction orthogonal to the first linearly polarized ultraviolet.
(12.3) The implemental method was the same as step (11.3).

COMPARATIVE EXAMPLE 13

(13.1) The implemental method was the same as step (11.1), but the first linearly polarized ultraviolet with an irradiation dosage of 100 mJ/cm$^2$ was used to crosslink and align the photoalignment film.
(13.2) The implemental method was the same as step (11.2). In addition, the exposed surface of the photoalignment film was irradiated by 100 mJ/cm$^2$ of a second linearly polarized ultraviolet with a polarized direction orthogonal to the first linearly polarized ultraviolet.
(11.3) The implemental method was the same as step (11.3).

COMPARATIVE EXAMPLE 14

(14.1) The implemental method was the same as step (8.1).
(14.2) The implemental method was the same as step (8.2). In addition, the exposed surface of the photoalignment film was irradiated by 25 mJ/cm$^2$ of a second linearly polarized ultraviolet with a polarized direction orthogonal to the first linearly polarized ultraviolet.
(14.3) The implemental method was the same as step (8.3).

COMPARATIVE EXAMPLE 15

(15.1) The implemental method was the same as step (8.1).
(15.2) The implemental method was the same as step (8.2). In addition, the exposed surface of the photoalignment film was irradiated by 30 mJ/cm$^2$ of a second linearly polarized ultraviolet with a polarized direction orthogonal to the first linearly polarized ultraviolet.
(15.3) The implemental method was the same as step (8.3).

COMPARATIVE EXAMPLE 16

(11.1) The implemental method was the same as step (8.1).
(16.2) The implemental method was the same as step (8.2). In addition, the exposed surface of the photoalignment film was irradiated by 50 mJ/cm$^2$ of a second linearly polarized ultraviolet with a polarized direction orthogonal to the first linearly polarized ultraviolet.
(16.3) The implemental method was the same as step (8.3).

COMPARATIVE EXAMPLE 17

(17.1) The implemental method was the same as step (11.1), but the first polarized ultraviolet with an irradiation dosage of 30 mJ/cm² was used to crosslink and align the photoalignment film.

(17.2) The implemental method was the same as step (11.2). In addition, the exposed surface of the photoalignment film was irradiated by 40 mJ/cm² of a second linearly polarized ultraviolet with a polarized direction orthogonal to the first linearly polarized ultraviolet.

(17.3) The implemental method was the same as step (11.3).

COMPARATIVE EXAMPLE 18

(18.1) The implemental method was the same as step (11.1), but the first polarized ultraviolet with an irradiation dosage of 30 mJ/cm² was used to crosslink and align the photoalignment film.

(18.2) The implemental method was the same as step (11.2). In addition, the exposed surface of the photoalignment film was irradiated by 60 mJ/cm² of a second linearly polarized ultraviolet with a polarized direction orthogonal to the first linearly polarized ultraviolet.

(18.3) The implemental method was the same as step (11.3).

COMPARATIVE EXAMPLE 19

(19.1) The implemental method was the same as step (11.1), but the first polarized ultraviolet with an irradiation dosage of 100 mJ/cm² was used to crosslink and align the photoalignment film.

(19.2) The implemental method was the same as step (11.2). In addition, the exposed surface of the photoalignment film was irradiated by 150 mJ/cm² of a second linearly polarized ultraviolet with a polarized direction orthogonal to the first linearly polarized ultraviolet.

(19.3) The implemental method was the same as step (11.3).

The irradiation dosage of the first and second polarized ultraviolet and the alignment effect are listed in Table 2 below. The polarization direction of the second linearly polarized ultraviolet was orthogonal to the polarization direction of the first linearly polarized ultraviolet.

TABLE 2

Comparative alignment effects of the photoalignment films with two irradiations

| Comparative Examples | Irradiation dosage of the first polarized ultraviolet (mJ/cm²) | Irradiation dosage of the second polarized ultraviolet (mJ/cm²) | Measured alignment situations of the photoalignment film |
|---|---|---|---|
| 8 | 20 | 0 | There is no change |
| 9 | 20 | 10 | Non-uniform alignment directions, hard to measure because of mura |
| 10 | 20 | 20 | Non-uniform alignment directions, hard to measure because of mura |
| 11 | 30 | 30 | Non-uniform alignment directions, hard to measure because of mura |
| 12 | 100 | 50 | Non-uniform alignment directions, hard to measure because of mura |
| 13 | 100 | 100 | Non-uniform alignment directions, hard to measure because of mura |
| 14 | 20 | 25 | Angle between the two alignment directions is 90°, measurable uniform alignment directions |
| 15 | 20 | 30 | Angle between the two alignment directions is 90°, good alignment effect |
| 16 | 20 | 50 | Angle between the two alignment directions is 90°, good alignment effect |
| 17 | 30 | 40 | Angle between the two alignment directions is 90°, good alignment effect |
| 18 | 30 | 60 | Angle between the two alignment directions is 90°, good alignment effect |
| 19 | 100 | 150 | Angle between the two alignment directions is 90°, good alignment effect |

It can be known from Table 2 that the resin molecules on the second surface of the photoalignment film was unstable to uniformly align with the second linearly polarized ultraviolet, when the irradiation dosage of the second linearly polarized ultraviolet was smaller than or equal to the irradiation dosage of the first linearly polarized ultraviolet. Therefore, mura occurred, and the alignment directions and polarization effect of the photoalignment film were hard to be measured by polarization analyzer.

Accordingly, the irradiation dosage of the second linearly polarized ultraviolet has to be larger than the irradiation dosage of the first linearly polarized ultraviolet to make the second surface of the photoalignment film have an alignment direction different from the alignment direction of the first surface. Thus, a composite optical retarder having a first optical retarder and a second optical retarder with different alignment directions can be further prepared.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A method of preparing a composite optical retarder, comprising:
    (a) providing a first support substrate;
    (b) forming an photoalignment film by coating a photoalignment resin on a top surface of the first support substrate, and irradiating an exposed first surface of the photoalignment resin with first linearly polarized ultraviolet having a first polarized direction and a first dosage to perform a first photoalignment reaction;

(c) forming a first optical retarder on an exposed first surface of the photoalignment film by coating a first liquid crystal coating material on the exposed first surface of the photoalignment film, and irradiating the first liquid crystal coating material with first non-polarized ultraviolet to cure the first liquid crystal coating material;

(d) exposing an opposite second surface of the photoalignment film by adhering a second support substrate onto the first optical retarder, and removing the first support substrate from the second surface of the photoalignment film;

(e) irradiating the second surface of the photoalignment film with second linearly polarized ultraviolet having a second polarized direction and a second dosage to perform a second photoalignment reaction, wherein the first and the second polarized directions are different and the second dosage is greater than the first dosage; and (f) forming a second optical retarder on the second surface of the photoalignment film by coating a second liquid crystal coating material on the second surface of the photoalignment film, and irradiating the second liquid crystal coating material with second non-polarized ultraviolet to cure the second liquid crystal coating material.

2. The method of claim 1, wherein the first non-polarized ultraviolet has an irradiation dosage in the range of 20-1000 mJ/cm$^2$.

3. The method of claim 1, wherein the first non-polarized ultraviolet has an irradiation dosage in the range of 170-500 mJ/cm$^2$.

4. The method of claim 1, wherein the first linearly polarized ultraviolet has an irradiation dosage at least 5 mJ/cm$^2$.

5. The method of claim 1, wherein the second non-polarized ultraviolet has an irradiation dosage at least 20 mJ/cm$^2$.

6. The method of claim 1, wherein the photoalignment film has a coating thickness in the range of 10 nm -1 μm.

7. The method of claim 1, wherein the photoalignment resin is photo-crosslinkable.

8. The method of claim 7, wherein the photoalignment resin has at least one functional group selected from a group consisting of cinnamate, coumarin, chalcone, maleimide, quinolinone, and bisbenzylidene.

9. The method of claim 1, wherein the first liquid crystal coating material is a photo-crosslinkable liquid crystal material having an acrylate group.

10. The method of claim 1, wherein the second liquid crystal coating material is a photo-crosslinkable liquid crystal material having an acrylate group.

11. The method of claim 1, wherein the first support substrate is made of glass, triacetyl cellulose, polyester-based resin, acetate-based resin, polyethersulfone-based resin, polycarbonate-based resin, polyamide-based resin, polyimide-based resin, polyolefin-based resin, acrylic-based resin, polyvinyl chloride-based resin, polystyrene-based resin, polyvinyl alcohol-based resin, polyarylate-based resin, polyphenylene sulfide-based resin, polyvinylidene chloride-based resin, or (methyl)acrylic-based resin.

12. The method of claim 1, wherein the second support substrate is made of glass, triacetyl cellulose, polyester-based resin, acetate-based resin, polyethersulfone-based resin, polycarbonate-based resin, polyamide-based resin, polyimide-based resin, polyolefin-based resin, acrylic-based resin, polyvinyl chloride-based resin, polystyrene-based resin, polyvinyl alcohol-based resin, polyarylate-based resin, polyphenylene sulfide-based resin, polyvinyl idene chloride-based resin, or (methyl)acrylic-based resin.

13. The method of claim 1, wherein the second support substrate is a release film, a polarizer, a protecting film, a diffuser film or plate, a light guide plate, bright enhancement film, a flexible panel, or a touch panel.

14. The method of claim 1, wherein the top surface of the first support substrate is further treated to improve release effect thereof.

15. The method of claim 1, wherein the step (b) further comprises drying the photoalignment resin after coating the photoalignment resin on the top surface of the first support substrate.

16. The method of claim 1, wherein the step (c) further comprises drying the first liquid crystal coating material after coating the first liquid crystal coating material on the first surface of the photoalignment film.

17. The method of claim 1, wherein the step (e) further comprises drying the second liquid crystal coating material after coating the second liquid crystal coating material on the second surface of the photoalignment film.

18. A composite optical retarder prepared by the method of claim 1, the retarder comprising:
- the second support substrate;
- the first optical retarder on the second support substrate;
- the photoalignment film on the first optical retarder; and
- the second optical retarder on the photoalignment film,
  wherein the photoalignment film is used to align the first and the second optical retarders in different directions.

* * * * *